United States Patent

[11] 3,595,083

[72] Inventor Horst Rudolf Dassler
 Vaduz, Liechtenstein
[21] Appl. No. 819,589
[22] Filed Apr. 28, 1969
[45] Patented July 27, 1971
[32] Priority Nov. 14, 1968
[33] France
[31] 173,645

[54] MEASURING INSTRUMENT FOR BALLS AND THE LIKE
 5 Claims, 1 Drawing Fig.
[52] U.S. Cl............................................. 73/389,
 33/138, 73/146.3, 73/419, 177/225, 177/245
[51] Int. Cl........................................B60c 23/02,
 G01l 7/16, G01g 3/02
[50] Field of Search........................................ 33/138;
 177/50, 245; 73/389, 146.2, 146.3, 146.8

[56] References Cited
 UNITED STATES PATENTS
 2,458,811  1/1949  Von Koscielski............ 33/138
 2,603,474  7/1952  Mandolf et al............. 33/138 X
 3,289,480  12/1966  Sams........................ 73/146.3 X Primary Examiner—Louis R. Prince
Assistant Examiner—Joseph W. Roskos
Attorneys—Robert E. Burns and Emmanuel J. Lobato ABSTRACT: A measuring instrument for inflated balls having a spring biased piston slideably held within a graduated cylinder. A pin is attached to the piston and extends outwardly from the cylinder for insertion into the valve of a ball. The pin is hollow and permits the air pressure within the ball to push the piston against its spring bias to indicate such pressure on the graduated cylinder. The same structure also provides means for weighting the ball by supporting it on the pin and determining the amount of spring deflection, and said instrument includes a linear measuring device for measuring the ball dimensions.

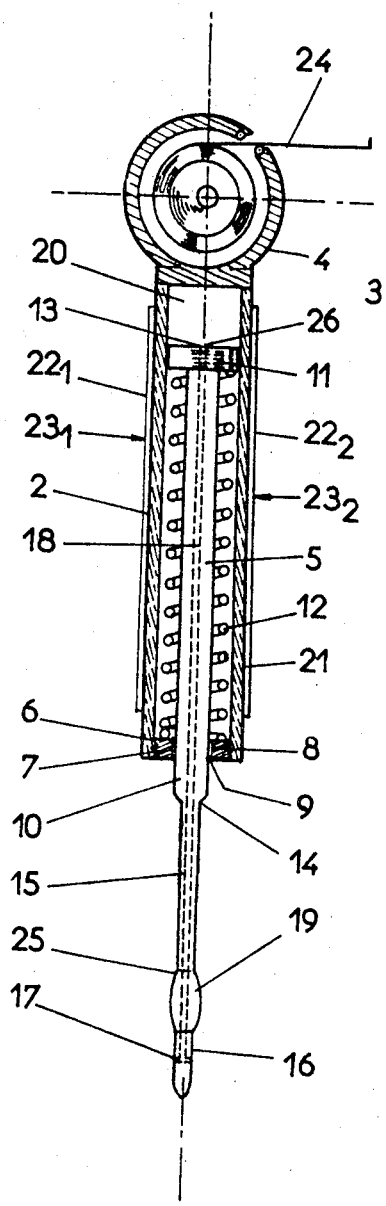

MEASURING INSTRUMENT FOR BALLS AND THE LIKE

The invention relates to a measuring instrument in particular for a ball. For games or other sporting encounters, there are either national or international rules which determine the specifications of the balls which are used. These specifications dictate the pressure, the weight and the circumference which these balls must have.

Up to now empirical means were used to carry out the measurements prescribed by the rules, or alternatively, three different instruments were used, which were not always at hand. For example, to verify the pressure one or another of the officials would go to a gas station and, by means of a manometer used to check the pressure in tires, would check the pressure of the ball.

Besides, to verify the weight of the ball, there was used a commercial scale; however, many sports clubs do not have a scale and it is impossible accordingly for the referee to check the correctness of the weight.

Referees have the habit of throwing the ball against the ground and to judge its condition according to its rebound. It is obvious that this cannot give precise indications.

The invention proposes to provide an instrument allowing either the referee, or club officials, to check at any moment, with the aid of an element which is small and very easy to handle, the weight, the pressure and the circumference of the ball and to thus comply with the requisites of the rules of the game.

To this effect, the invention is concerned with a measuring instrument in particular for a ball, characterized in that it comprises in combination pressure measuring means, weight measuring means and linear measuring means combined in an easy to handle small instrument.

The invention will be better understood by referring to the following description made by way of nonlimiting example and to the accompanying drawing whose single FIGURE shows a measuring instrument according to the invention.

The measuring instrument 1 comprises a hollow body 2 having in its upper part a casing 4. This hollow body serves as a cylinder to a removable element forming a piston. The lower opening 6 of the hollow body 2 is closed by a closure 7 having in its center 8 an opening 9 through which passes the rod 10 of piston 5.

Between the head 11 of piston 5 and closure 7 is positioned an elastic element 12 such as a coil spring. This elastic element 12 is compressible and brings the head 11 of piston 5 to its starting point 13.

There is provided at the extremity 14 of rod 10 of piston 5 a needle 15 which is pushed in the valve of the ball. The extremity 16 of the needle has an opening 17 connected to an inner conduit 18 provided in the center of needle 15 and in the center of piston 5. The said needle has an augmented section 19, thereby providing the needle with a portion capable of being gripped by the valve of the ball. The conduit 18 passes lengthwise through needle 15 in piston 5 in such a way that air from the ball circulates through said conduit 18 to enter chamber 20.

The hollow body 2 has on its outside 21 measuring elements $22_1$ and $22_2$ which have graduations $23_1$ and $23_2$. Naturally, these graduations $23_1, 23_2$ can also be engraved directly on the hollow body 2.

Casing 4 houses a flexible measuring tape 24 for measuring the circumference of the ball. This tape 24 is preferably metallic and has graduations thereon for allowing determination of the circumference of the ball. A rewinding spring (not shown) may be incorporated in a known manner to retract the tape into the casing upon completion of its use.

There can also be provided fluorescent elements, which would make it possible to proceed to the required readings in poorly lit places. Similarly, the measuring instrument can be provided with a luminous element.

To measure the weight of the ball, needle 15 is introduced in the valve of the ball in such a way that the outer end of the valve tightens on narrowed section 25. The instrument is held through its casing 4 and the weight of the ball causes a traction on the piston rod. The upper side 26 of the head 11 of piston 5 serves as an index and allows reading of the measurements.

To measure the pressure of the air in the ball, the introduction of the needle 15 in the valve is continued in such a way that the needle projects and that the orifice 17 is in contact with air, this air builds up inside conduit 18 and enters chamber 20 pushing back the piston head. The position of this piston head serves to determine the pressure of the air in the ball.

The present invention has numerous advantages.

The ball weighter and the manometer form a single instrument. The measuring of the weight and the air pressure of the ball is thus effected by means of the same cylinder and the same piston. In effect as indicated above, the weighing occurs as a result of suspending the ball to the needle which causes a pull on the piston rod which makes it possible to check the weight of the ball with the aid of the marked graduation markings.

The measurement of the air pressure in the ball takes place by introducing the needle further into the valve, so that the air pressure within the ball is coupled through the orifice 17 to push the piston back, thus, and the air pressure is indicated by the positioning of the piston head, allowing the pressure to be checked by a simple reading.

Although the invention has been described with respect to one embodiment thereof it is understood that the same is in no way limited thereto and that there can be brought to it various modifications of shape and materials without thereby departing from the concept and scope of the invention.

I claim:

1. A measuring instrument for measuring the pressure and weight of inflated balls and the like having valves, comprising in combination: means for measuring pressure and means for measuring weight, said pressure measuring means comprising manometer means including a conduit for insertion in a valve of an inflated ball, a cylinder, a piston slidably disposed within said cylinder and connected to said conduit, said piston having a passageway therethrough in communication with said conduit, wherein the air pressure of the ball is coupled through said conduit and piston to said cylinder to exert a force on said piston, bias means for urging said piston toward one end of said cylinder, said piston also serving as said weight measuring means when said conduit is inserted in the valve and the cylinder is held whereby the weight of the ball causes displacement of said piston, and indicia means on said instrument for indicating displacement of said piston within said cylinder under the force of said air pressure coupled to said cylinder and under the weight of the ball.

2. A measuring instrument as set forth in claim 1, wherein said indicia means comprises a first set of graduations marked on said cylinder for indicating the displacement of said piston in response to the pressure in said ball.

3. A measuring instrument as set forth in claim 2, in which said indicia means further comprises a second set of graduations marked on said cylinder for indicating the displacement of said piston in response to the force exerted on said conduit by the weight of said ball.

4. A measuring instrument as set forth in claim 1, wherein said conduit comprises a ball inflating needle having augmented means thereon for enabling the valve of the ball to grasp said needle.

5. A measuring instrument as set forth in claim 1, further comprising linear measuring means including a casing attached to said cylinder, and a flexible measuring tape disposed within said casing.